United States Patent
Ambrose et al.

(10) Patent No.: US 8,472,605 B2
(45) Date of Patent: Jun. 25, 2013

(54) EASY CALL ABANDON

(75) Inventors: Stephen John Ambrose, Round Rock, TX (US); Robert Z. Evora, Douglasville, GA (US); Coulter C. Henry, Jr., Marietta, GA (US); Alexander E. Silverman, Mercer Island, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/549,653

(22) Filed: Jul. 16, 2012

(65) Prior Publication Data

US 2012/0275580 A1 Nov. 1, 2012

Related U.S. Application Data

(63) Continuation of application No. 11/830,308, filed on Jul. 30, 2007, now Pat. No. 8,233,607.

(51) Int. Cl.
*H04M 3/42* (2006.01)

(52) U.S. Cl.
USPC .................. 379/215.01; 379/201.01

(58) Field of Classification Search
USPC ........................ 379/215.01, 201.01
See application file for complete search history.

(56) References Cited

U.S. PATENT DOCUMENTS

| | | | |
|---|---|---|---|
| 5,894,504 | A | 4/1999 | Alfred et al. |
| 7,003,087 | B2 | 2/2006 | Spencer et al. |
| 7,769,146 | B1 | 8/2010 | Weaver et al. |
| 2003/0021393 | A1 | 1/2003 | Caharel et al. |
| 2004/0136505 | A1 | 7/2004 | Garg et al. |
| 2004/0258220 | A1 | 12/2004 | Levine et al. |
| 2005/0277408 | A1 | 12/2005 | Stuckman et al. |
| 2007/0121831 | A1 | 5/2007 | Kim et al. |
| 2008/0080681 | A1 | 4/2008 | Burgan et al. |

*Primary Examiner* — Quynh Nguyen
(74) *Attorney, Agent, or Firm* — Abel Law Group, LLP

(57) ABSTRACT

A technique for managing simultaneous incoming and outgoing calls between the same far-end called terminal and far-end calling terminal and/or same user associated with a far-end called terminal and user associated with the far-end calling terminal includes an easy call abandon facility on a near-end terminal configured to compare information associated with an outgoing call to information associated with an incoming call. The easy call abandon facility is configured to initiate an audible or visible indicator when the terminal and/or user of the far-end called party is the same as that of the far-end calling party. In response to an easy call abandon indication received from a near-end terminal user, the easy call abandon facility disconnects the call from the near-end and connects the call received from the far-end terminal.

12 Claims, 5 Drawing Sheets

EASY CALL ABANDON

CROSS-REFERENCE TO RELATED APPLICATION(S)

This application is a continuation of U.S. patent application Ser. No. 11/830,308, filed Jul. 30, 2007, entitled "Easy Call Abandon," naming inventors Stephen John Ambrose, Robert Z. Evora, Coulter C. Henry, Jr., and Alexander E. Silverman, which application is hereby incorporated by reference.

BACKGROUND

1. Field of the Invention

The invention relates to telecommunications in general and more particularly to wireless communications devices.

2. Description of the Related Art

An exemplary telecommunications network (e.g., telecommunications network 100 of FIG. 1) establishes call connections between terminals using any one of multiple call connection paths of network 104. Network 104 may include mobile switching centers (MSCs), Public Switched Telephone Network (PSTN) switches, Voice over Internet Protocol (VoIP) nodes, modems, servers, and/or other suitable network elements for establishing call connections between terminals. Network 104 may include other components that provide services to users of the network.

For example, network 104 may include voicemail servers that are partitioned to include mailboxes corresponding to individual terminals (e.g., terminals 102, 104, 106, and 108) and/or terminal users or service subscribers. When a terminal is off-hook or otherwise unavailable (e.g., powered-off), a call attempt from another terminal coupled to the network may result in a busy signal at the calling terminal or the network may establish a connection between the calling terminal and a voicemail server associated with the called terminal. An exemplary voicemail service stores voicemail messages on a voicemail server and a message notification server interacts with a subscriber's terminal to indicate the presence of a new message. In at least one exemplary voicemail system, a user initiates a message check procedure and the terminal dials the message notification server to obtain information regarding recorded messages stored in the subscriber's mailbox.

Network 104 may also provide a caller identification service (e.g., caller identity delivery on call waiting, i.e., CIDCW) to individual terminals. A typical caller identification service provides a terminal with an indication of the identity of a caller without requiring the user to answer the call. In operation, the caller identification system associated with the called party may retrieve information about the calling terminal from a network database and may provide that information to the called terminal. For example, network 104 may send a telephone number and/or user name associated with a calling terminal to a called terminal while the called terminal receives a ringing signal. This information may be presented to the user of the called terminal using a display or audio techniques. In addition, network 104 may provide a call waiting service to individual terminals. The call waiting service allows a called party to suspend a current call and switch to a new incoming call.

SUMMARY

A technique for managing simultaneous incoming and outgoing calls between the same far-end called terminal and far-end calling terminal and/or same user associated with a far-end called terminal and user associated with the far-end calling terminal includes an easy call abandon facility on a near-end terminal configured to compare information associated with an outgoing call to information associated with an incoming call. The easy call abandon facility is configured to initiate an audible or visible indicator when the terminal and/or user of the far-end called party is the same as that of the far-end calling party. In response to an easy call abandon indication received from a near-end terminal user, the easy call abandon facility disconnects the call from the near-end and connects the call received from the far-end terminal.

In at least one embodiment of the invention, an apparatus includes a facility configured to initiate both a release of a first call from a first communications device including the facility to a second communications device. The facility is configured to initiate a call connection of a second call received by the first communications device from a third communications device, in response to a predetermined user input received by the first communications device. In at least one embodiment of the invention, the facility is configured to initiate providing a user-indicator by the first communications device at least partially based on information associated with the third communications device. In at least one embodiment of the invention, the facility is configured to initiate providing a user-indicator by the first communications device when a user associated with the second communications device and a user associated with the third communications device are the same and the providing is not initiated otherwise.

In at least one embodiment of the invention, a method includes initiating, by a first communications device, a release of a first call from the first communications device to a second communications device and initiating by the first communications device, a call connection of a second call received by the first communications device from a third communications device. Both the release and the initiating are in response to receiving, by the first communications device, a predetermined user input. In at least one embodiment, the method includes providing a user-indicator at least partially based on the information associated with the third communications device. In at least one embodiment, the method includes providing by the first communications device, a user-indicator at least partially based on the information associated with the third communications device. In at least one embodiment of the method, the user-indicator indicates that a user associated with the second communications device and a user associated with the third communications device are the same and the user-indicator is not provided otherwise.

In at least one embodiment of the invention, an apparatus includes a facility configured to provide an indicator of a concurrent call condition by a first communications device associated with a first phone number including the facility. The indicator is provided in response to a first call from the first communications device to a second communications device associated with a second phone number and a second call to the first communications device from a third communications device associated with a third phone number, different from the second phone number, the second and third phone numbers being associated with the same user. The facility is configured to initiate both a release of the first call from the first communications device to the second communications device and configured to initiate a call connection of the second call received by the first communications device from the third communications device, in response to a predetermined user input received by the first communications device. The first call includes a call connection between the first communications device and a voicemail system associated with the second communications device. The release of the first call includes terminating the call connection between the first communications device and the voicemail system and the release includes prompting a user of the communications device to delete an incomplete voicemail message prior to the termination.

In at least one embodiment of the invention, a method includes providing an indicator of a concurrent call condition, by a first communications device associated with a first phone number including the facility, in response to a first call from the first communications device to a second communications device associated with a second phone number and a second call to the first communications device from a third communications device associated with a third phone number, different from the second phone number, the second and third phone numbers being associated with the same user. The method includes initiating a release of the first call from the first communications device to the second communications device. The method includes initiating a call connection of the second call received by the first communications device from the third communications device in response to a predetermined user input received by the first communications device. The first call includes a call connection between the first communications device and a voicemail system associated with the second communications device. The release of the first call includes terminating the call connection between the first communications device and the voicemail system and the release includes prompting a user of the communications device to delete an incomplete voicemail message prior to the termination.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF SPECIFIC EMBODIMENT(S)

Figure 1:
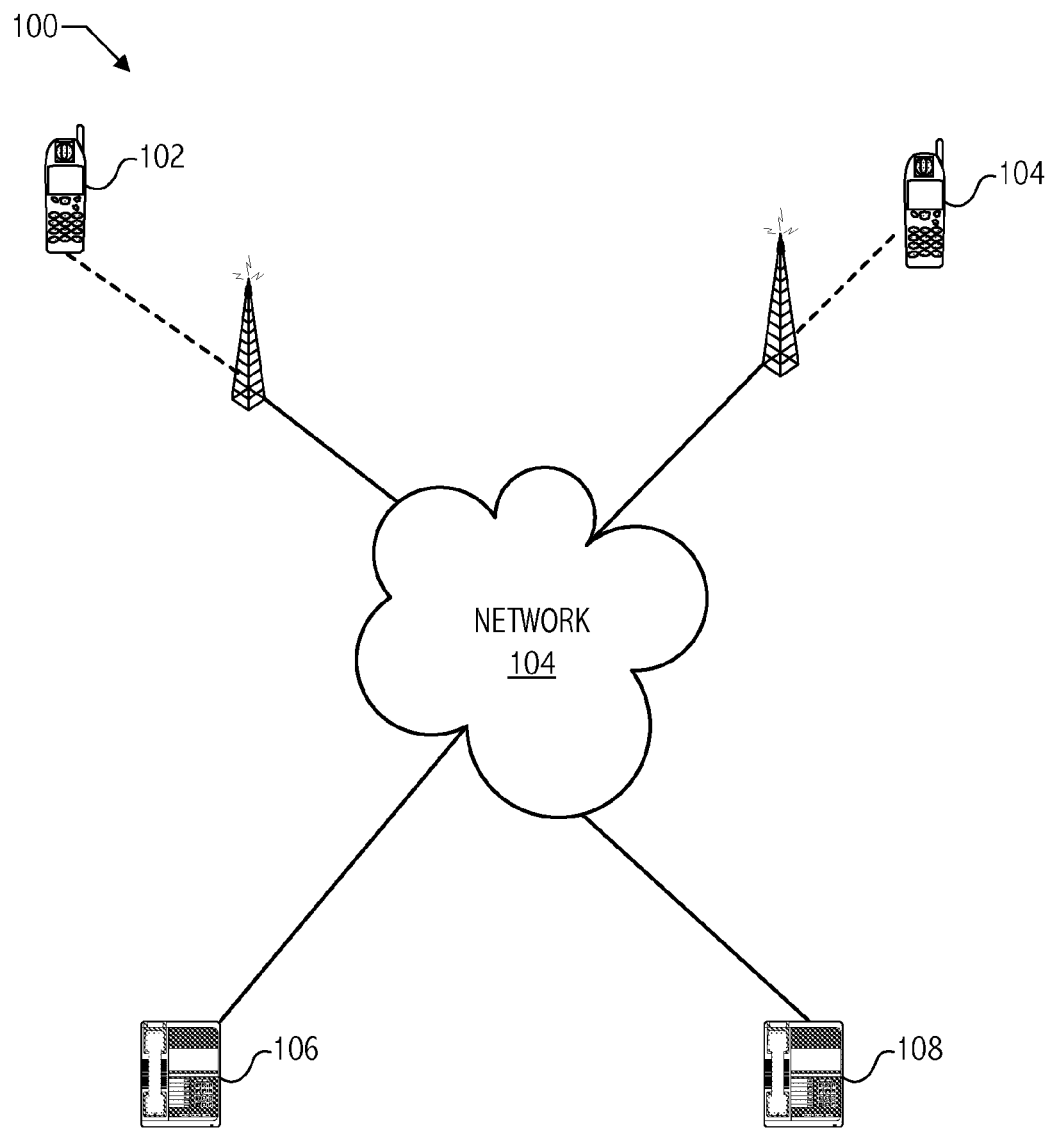
FIG. 1 illustrates a block diagram of an exemplary communications system.

In general, as referred to herein, a call connection includes the complete path between a terminal or network node and another terminal or network node over which one-way or two-way communications may be provided. Referring to FIG. 1, call connections between individual communications devices typically are not established by distinct paths of a communications network. Accordingly, if terminal 102 initiates a call to terminal 108 and terminal 108 simultaneously initiates a call to terminal 102, the network will attempt to establish separate call connections between terminals 102 and 108, thus utilizing network resources for each of those calls.

However, those attempts may not result in establishing a call connection between the terminals for either call.

Figure 2:
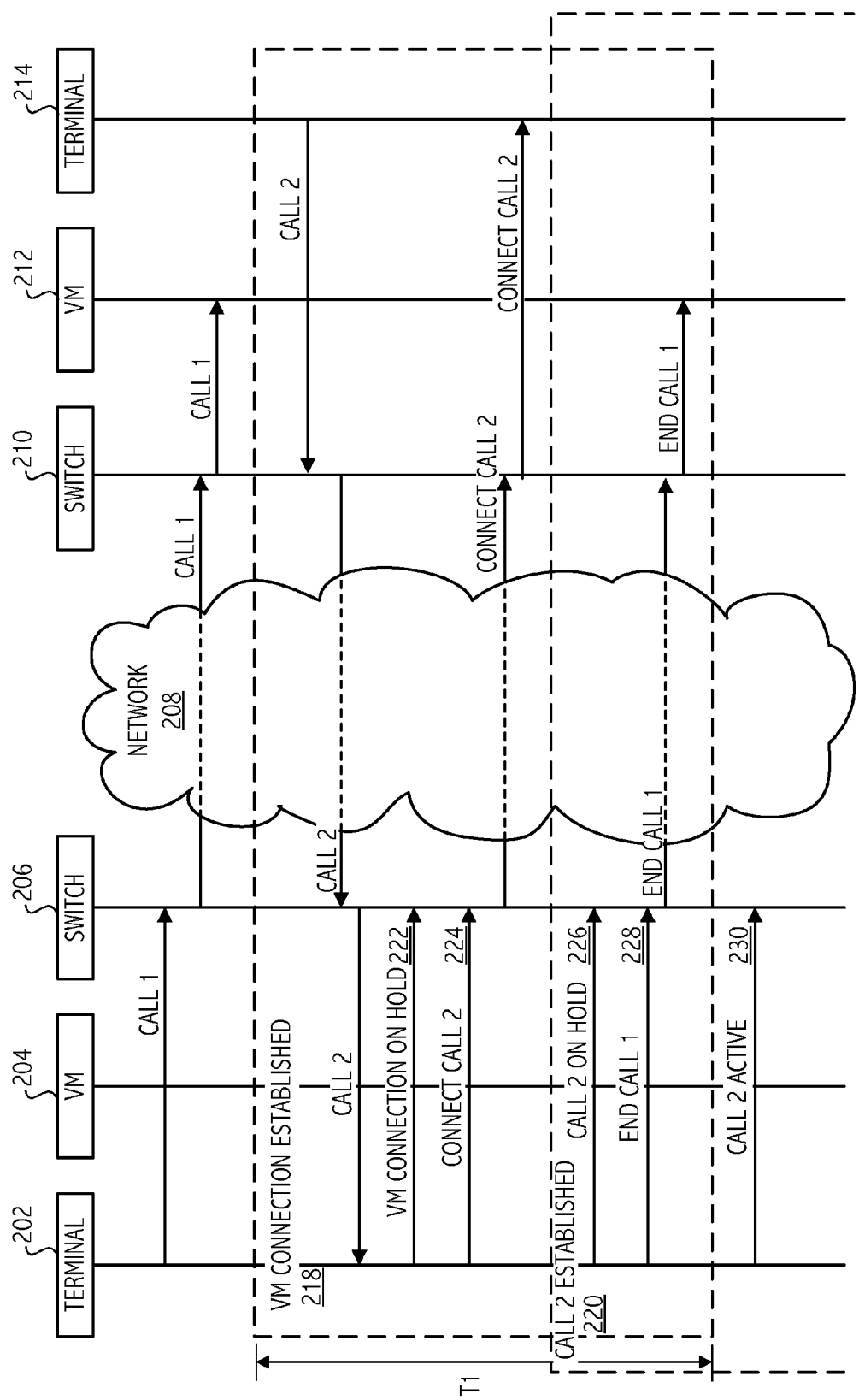
FIG. 2 illustrates an exemplary signal flow including simultaneous calls between two terminals coupled to a communications network.

For example, referring to FIG. 2, exemplary terminal 202 and exemplary terminal 214 may be mobile communications devices, VoIP communications devices, POTS communications devices, other suitable communications devices, or any combination thereof. In an exemplary call scenario, terminal 202 initiates a call (e.g., CALL 1) to terminal 214. Meanwhile, terminal 214 is unavailable, e.g., terminal 214 may be powered-off, terminal 214 may already be in use and/or the user of terminal 214 may not answer CALL 1. Since a user of terminal 214 subscribes to a voicemail service, switch 210 connects CALL 1 to a voicemail system associated with terminal 214 and a call connection (e.g., voicemail connection 218) is established between voicemail system 212 and terminal 202.

While voicemail connection 218 is established, terminal 214 attempts to call terminal 202. Since the user of terminal 202 subscribes to a call waiting service, the user of terminal 202 receives an indicator of CALL 2. The user of terminal 202 then puts CALL 1 on hold (222) and connects to CALL 2 (224), establishing CALL 2 between terminal 202 and terminal 214 (220). The user of terminal 202 has not yet released the voicemail connection between terminal 202 and voicemail system 212. The user of terminal 202 may have already begun leaving a message that was interrupted when the user of terminal 202 connected to CALL 2. However, the user of terminal 202 may not need to leave a voicemail message for terminal 214 because the user of terminal 202 now has an established call with the user of terminal 214. The user of terminal 202 may let the voicemail connection time-out and terminate automatically, or the user of terminal 202 may actively put CALL 2 on hold (226), switch back to CALL 1, end CALL 1 (228), and return to CALL 2 (230). Such scenarios result in tying up network resources, requiring multiple actions from the user of terminal 202, and inconveniencing the users of terminals 202 and 214.

Figure 3:
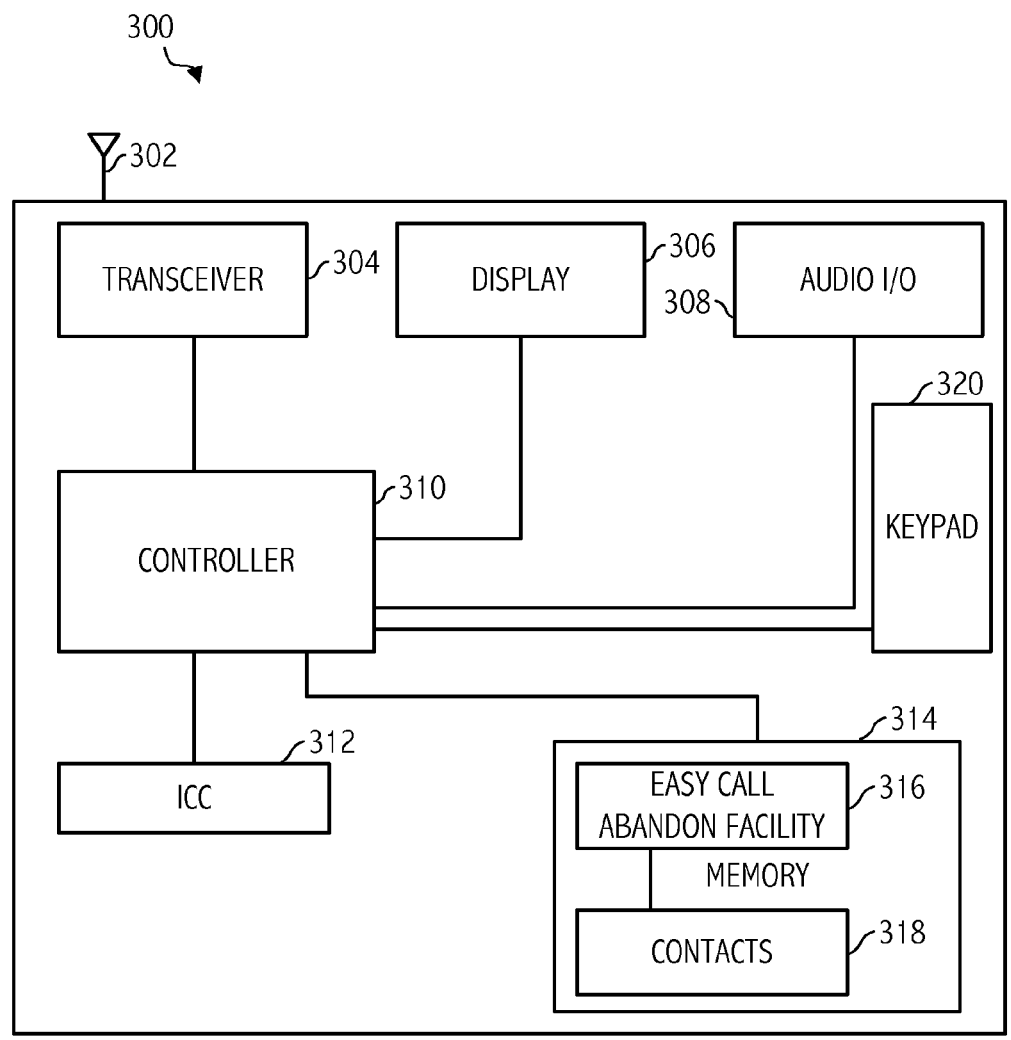
FIG. 3 illustrates a block diagram of an exemplary mobile communications device including an easy call abandon facility consistent with at least one embodiment of the invention.

Referring to FIG. 3, an exemplary communications device (e.g., communications device 300) includes transceiver 304 and user interfaces including, e.g., display 306, audio I/O 308, and keypad 320. Controller 310 processes information received from transceiver 304 and provides information to one or more of the user interfaces 306 and 308. Controller 310 receives information (e.g., user selection inputs, phone numbers dialed by the user, call content, etc.) from one or more of the user interfaces. Controller 310 processes that information for transmission over a communications medium (e.g., over-the-air mechanisms using antenna 302) coupled to communications device 300. Controller 310 may include one or more of a general purpose microprocessor and microcontroller circuits that execute software and/or firmware stored in memory 314, co-processor circuits, custom circuitry, or other suitable circuitry.

In at least one embodiment, communications device 300, includes an Integrated Circuit Card (e.g., ICC 312), which is any smart card, chip card, or other card that includes embedded integrated circuits that process information. An ICC can receive inputs and process those inputs using applications on the ICC to generate outputs. The ICC typically includes memory storage components and at least some logic circuits, which may include microprocessor circuits. Examples of an ICC include a Subscriber Identity Module (SIM) of a GSM device, a Universal Integrated Circuit card (UICC) of a UMTS device, a Removable User Identity Module (RUIM) of a CDMA device, or other suitable, removable integrated circuit card. The ICC typically includes a service-subscriber key used to identify a wireless communications device. The ICC allows a user to change wireless communications devices by removing the ICC from one wireless communications device and inserting it into another wireless communications device.

In at least one embodiment, communications device 300 includes easy call abandon facility 316. In at least one embodiment, easy call abandon facility 316 may be implemented using dedicated hardware and/or a firmware or software executable stored in memory 314 for execution on controller 310. Although easy call abandon facility 316 is illustrated as being software and/or firmware stored in memory 314 for execution on controller 310, the functions of easy call abandon facility 316 may be implemented in hardware. In at least one embodiment, easy call abandon facility 316 is implemented by an ICC.

In at least one embodiment, easy call abandon facility 316 monitors calls initiated by communications device 300 and monitors calls received by communications device 300. In at least one embodiment, easy call abandon facility 316 is a software routine executing in a background process on controller 310 and polls a memory element (e.g., a memory element in memory 314) for information indicative of a simultaneous call scenario. In at least one embodiment, easy call abandon facility 316 is an interrupt driven routine, e.g., called by controller 310 in response to one or more interrupts indicative of the communications device calling another terminal or the communications device receiving a call from another terminal. Information is communicated between easy call abandon facility 316 and one or more of transceiver 304, display 306, audio I/O 308, keypad 320, or other user interfaces, via controller 310 and/or memory 314. Upon detecting that both a call is being initiated or in-progress and a call is being received, easy call abandon facility 316 compares information associated with the outgoing call to information associated with the incoming call and determines whether those calls are associated with the same terminal and/or user on the far-end, consistent with one or more embodiments described with reference to FIGS. 4 and 5.

Figure 4:
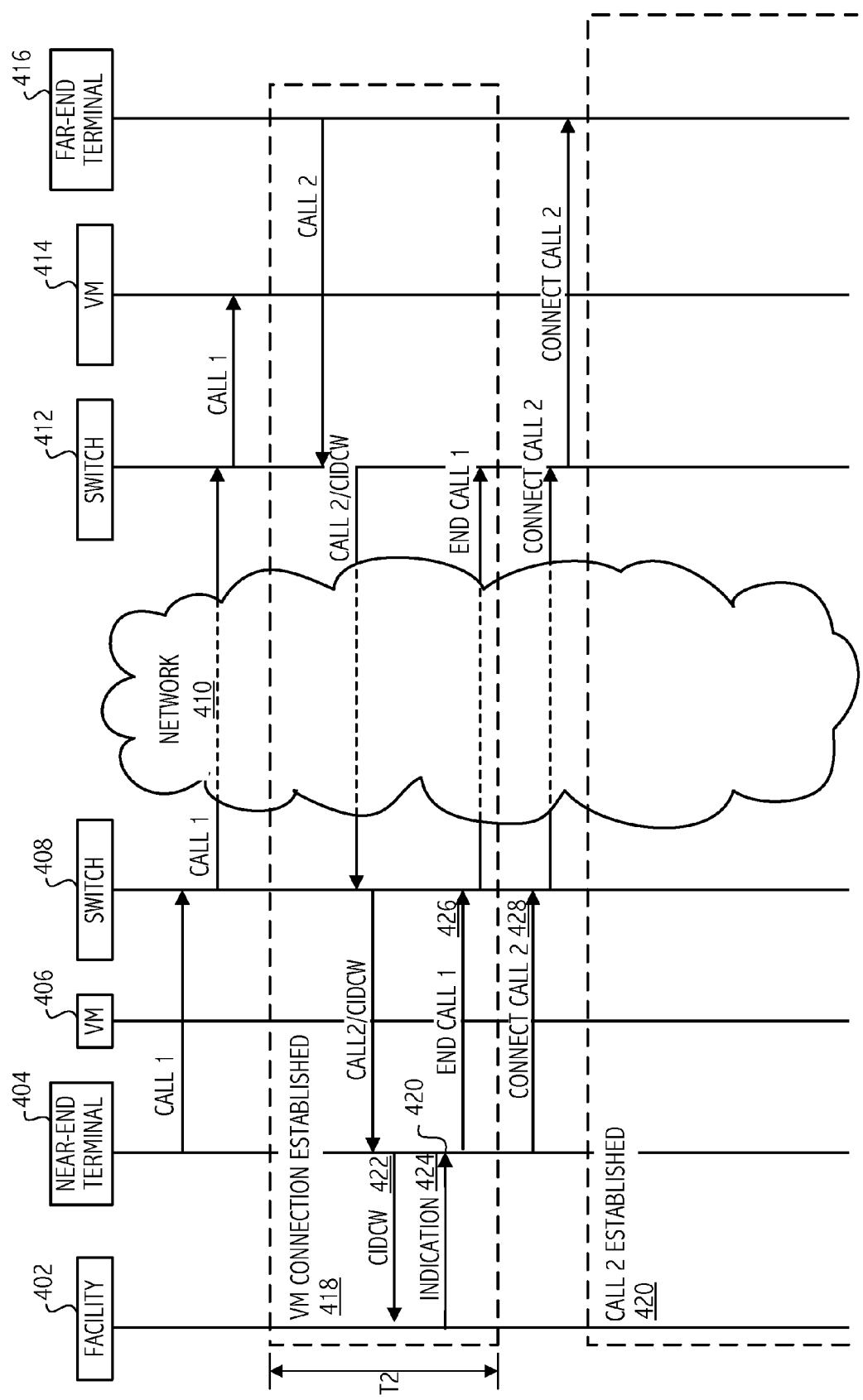
FIG. 4 illustrates an exemplary signal flow including simultaneous calls between two terminals coupled to a communications network consistent with at least one embodiment of the invention.

Referring to FIG. 4, near-end terminal 404 and far-end terminal 416 may be mobile communications devices, VoIP communications devices, POTS communications devices, other suitable communications devices, or any combination thereof. Near-end terminal 404 includes an embodiment of an easy call abandon facility (e.g., easy call abandon facility 402). In an exemplary call flow, a user of near-end terminal 404 attempts to call far-end terminal 416, e.g., by dialing a number associated with far-end terminal 416. Near-end terminal 404 sends appropriate signals to initiate CALL 1 to far-end terminal 416 over a communications path including switch 408, switch 412, and network 410. Meanwhile, the user of far-end terminal 416 is unavailable, e.g., far-end terminal 416 may be powered-off, far-end terminal 416 may already be in-use and/or the user of far-end terminal 416 may not answer CALL 1. Since the user of far-end terminal 416 subscribes to a voicemail service, switch 412 connects CALL 1 to voicemail system 414 associated with far-end terminal 416 and voicemail connection 418 is established between voicemail system 414 and near-end terminal 404.

While voicemail connection 418 is established, a user of far-end terminal 416 attempts to call near-end terminal 404. Since the user of near-end terminal 404 subscribes to a caller identity delivery on call waiting (CIDCW) service, near-end terminal 404 receives from network 410 an indicator of CALL 2 and identity information associated with a terminal of CALL 2. Near-end terminal 404 communicates the identity information to easy call abandon facility 402 (422), which typically resides on near-end terminal 404. Easy call abandon facility 402 compares called terminal information associated with CALL 1 to the calling terminal information associated with CALL 2. Since the comparison indicates that the called terminal and the calling terminal are the same, then easy call abandon facility 402 initiates near-end terminal 404 providing an indication (e.g., by an audible or visible indicator) of the simultaneous calls associated with far-end terminal 416 (424).

The user of near-end terminal 404 receives the indication and decides to end CALL 1 to establish CALL 2. Accordingly, the user of near-end terminal 404 provides an easy call abandon indication to near-end terminal 404 using any technique for providing information to near-end terminal 404 (e.g., voice command, depressing a button on a key pad, touching a button on a touch screen, or other suitable technique). In response, easy call abandon facility 402 causes near-end terminal 404 to send appropriate signals to end CALL 1 (426) and causes near-end terminal 404 to send appropriate signals to connect CALL 2 (428). As a result, CALL 2 is established (420). Thus, easy call abandon facility 402 facilitates releasing network resources sooner than in the call sequence of FIG. 2. Since the user does not need to put CALL 1 on hold (222), connect to CALL 2 (224), put CALL 2 on hold (226), end CALL 1 (228), and then return to CALL 2 (230), the time (t2) that network resources are being utilized for CALL 1 using easy call abandon facility 402, as illustrated in FIG. 4, is less than the time (t1) that network resources are being utilized for CALL 1 without easy call abandon facility 402, as illustrated in FIG. 2. Accordingly, network 410 may increase the volume of calls being handled in a particular period of time. In addition, fewer user interactions are required to successfully establish a call connection between users calling each other simultaneously.

Referring back to FIG. 3, in at least one embodiment, easy call abandon facility 316 performs an identity lookup (e.g., by accessing contacts database 318 stored in memory 314) to determine information about the far-end terminal calling communications device 300. For example, a contacts entry may include terminal identifiers (e.g., phone numbers) for one or more terminals associated with a particular user, e.g., a user's home, office, and mobile communications devices. Easy call abandon facility 316 may provide an indicator of the particular communications device (e.g., home, office, mobile, etc.) that is calling communications device 300, allowing the user of communications device 300 to decide whether to answer the call or to continue to leave a voicemail for the user on a voicemail system associated with the called far-end terminal.

In at least one embodiment of easy call abandon facility 316, if the comparison indicates that the called terminal and the calling terminal are not the same, then easy call abandon facility 316 may compare the information associated with the calling terminal to entries in a contacts database 318 stored in memory 314. If the calling terminal and the called terminal are associated with the same contact, then easy call abandon facility 316 notifies a user of communications device 310 that the calling terminal and the called-terminal are associated with the same contact. The user of communications device 300 may respond by any suitable technique (e.g., voice command received by audio I/O 308, depressing one or more keys of keypad 320, interacting with a touch screen button or menu, or other I/O interface of communications device 300, etc.) to indicate a desire to end a first call and connect to a second call. In response to the user indication, easy call abandon facility 316 ends the first call and connects the second call.

Figure 5:
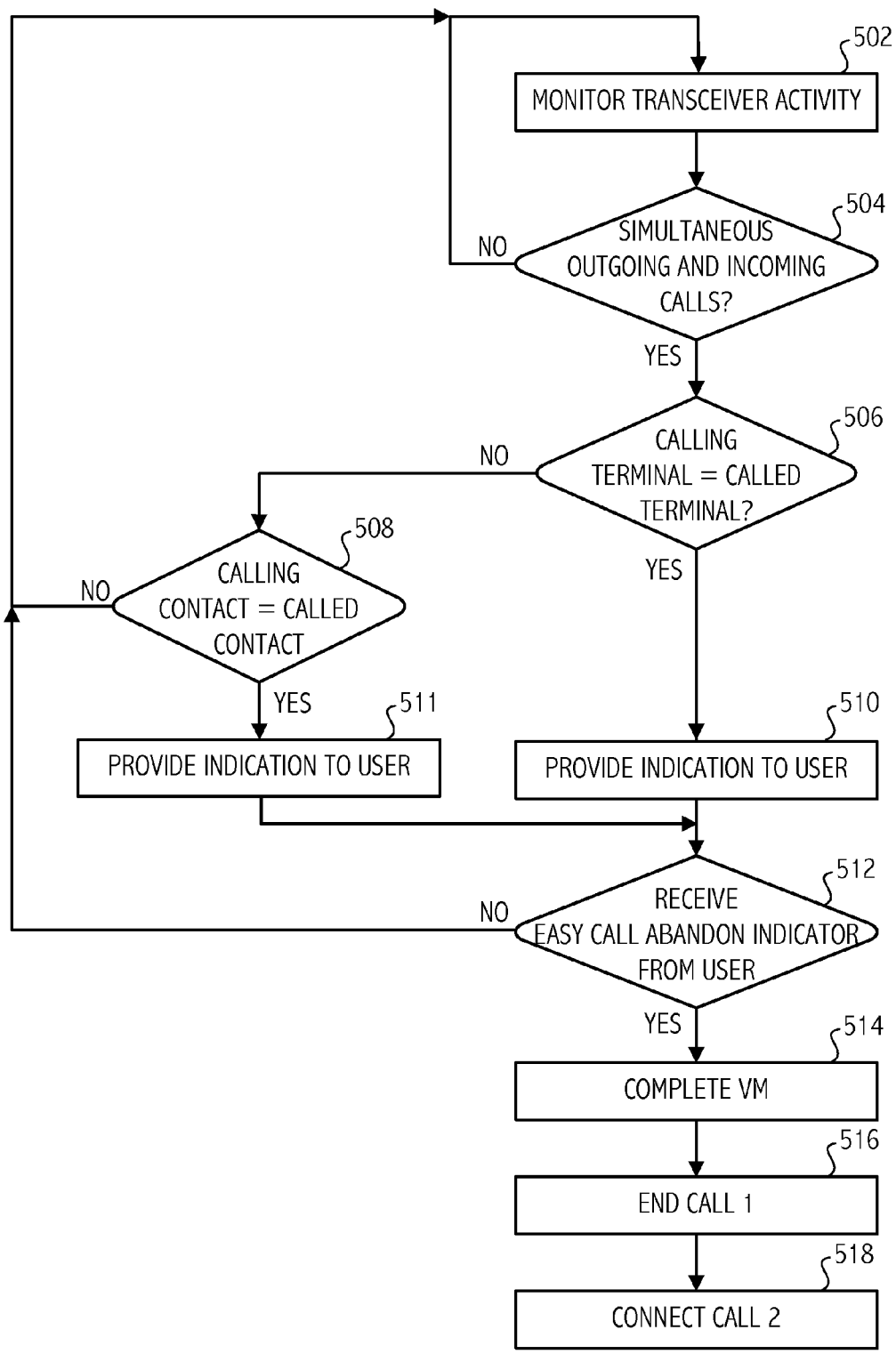
FIG. 5 illustrates exemplary information and control flows associated with an easy call abandon facility consistent with at least one embodiment of the invention.

Referring to FIG. 5, an exemplary easy call abandon facility monitors transceiver activity (502). The monitoring functions may be polling-based, event-driven, or a combination thereof. For example, referring to FIG. 3, easy call abandon facility 316 may operate in the background and poll one or more locations in memory 314 to detect simultaneous incoming and outgoing calls. The monitoring function may be event-driven, e.g., easy call abandon facility 316 receives transceiver information from one or more interrupt routines executing on controller 310. The easy call abandon facility 316 determines whether a simultaneous call condition exists (504). If not, easy call abandon facility 316 continues to monitor transceiver activity (502). If a simultaneous call condition exists, easy call abandon facility 316 determines whether the far-end called terminal is the same as the far-end calling terminal (506). For example, easy call abandon facility 316 compares information associated with the outgoing call to information associated with the incoming call and determines whether those calls are associated with the same terminal on the far-end.

If the far-end called terminal is the same as the far-end calling terminal, the easy call abandon facility provides an indication of this condition (e.g., using any suitable user interface) to a user of the near-end terminal (510). If the far-end called terminal is not the same as the far-end calling terminal, in at least one embodiment, the easy call abandon facility continues to monitor transceiver activity (502). In at least one embodiment, if the far-end calling terminal is not the same as the far-end called terminal, the easy call abandon facility may determine whether a user identity associated with the far-end called terminal is the same as a user identity associated with a far-end calling terminal (508), e.g., based on information accessed from a contacts database stored in memory. If a user identity associated with the far-end called terminal is not the same as a user identity associated with a far-end calling terminal, the easy call abandon facility continues to monitor transceiver activity (502). If a user identity associated with the far-end called terminal is the same as a user identity associated with a far-end calling terminal, the easy call abandon facility provides an indication of this condition to a user of the near-end terminal (511).

In at least one embodiment, the easy call abandon facility may determine from a contacts database entry the type of terminal the far-end calling party is calling from and include an indication thereof to the user. For example, the easy call abandon facility provides an indication of whether the far-end calling party is calling from home, office, or mobile terminals. A user of the near-end terminal decides whether to establish an incoming call. Meanwhile, the easy call abandon facility determines (e.g., by polling input registers, memory, or based upon an interrupt) whether the easy call abandon indicator is received from the user (512). If an easy call abandon indicator is not received after a period of time, the easy call abandon facility takes no action with respect to the simultaneous calls and the easy call abandon facility monitors transceiver activity (502) once again.

If an indicator is received from a user to abandon the call to the far-end terminal, in at least one embodiment, the easy call abandon facility may automatically, or conditionally (e.g., based on interaction with the user of the near-end terminal) append a header to a voicemail or send a signal sequence to delete an incomplete voicemail message indicative of the easy call abandon function on the far-end user's voicemail service (514). For example, the header may state that "the person leaving this voicemail switched over to your incoming call. Therefore, the following voicemail message may be incomplete." Then, easy call abandon facility ends the call from the near-end terminal to the far-end terminal and connects to the call from the far-end terminal to the near-end terminal (518).

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic medium and a network, wireline, wireless or other communications medium.

The description of the invention set forth herein is illustrative, and is not intended to limit the scope of the invention as set forth in the following claims. For example, while the invention has been described in an embodiment in which a mobile communications device includes an easy call abandon facility, one of skill in the art will appreciate that the teachings herein can be utilized with a variety of other communications devices (e.g., personal data assistant (PDA), multimedia player, portable game console, a convergence device, such as a multimedia communications device with PDA capabilities, etc.). Variations and modifications of the embodiments disclosed herein may be made based on the description set forth herein, without departing from the scope and spirit of the invention as set forth in the following claims.

What is claimed is:

1. An apparatus comprising:
 a facility configured to provide an indicator of a concurrent call condition, by a first communications device associated with a first phone number including the facility, in response to a first call from the first communications device to a second communications device associated with a second phone number and a second call to the first communications device from a third communications device associated with a third phone number, different from the second phone number, the second and third phone numbers being associated with a user, the indicator of the concurrent call condition being based on a contact entry of a database, the contact entry associating the second phone number and the third phone number with a contact corresponding to the user,
 wherein the facility is configured to initiate both a release of the first call from the first communications device to the second communications device and configured to initiate a call connection of the second call received by the first communications device from the third communications device, in response to a predetermined user input received by the first communications device,
 wherein the first call includes a call connection between the first communications device and a voicemail system associated with the second communications device,
 wherein the release of the first call includes terminating the call connection between the first communications device and the voicemail system and the release includes prompting a user of the communications device to delete an incomplete voicemail message prior to the termination.

2. The apparatus, as recited in claim 1, wherein the indicator indicates a type of the third communications device.

3. The apparatus, as recited in claim 1, wherein the facility comprises a computer program product executable encoded in one or more computer readable media selected from the set of disk, tape, or other magnetic, optical, or electronic storage medium.

4. The apparatus, as recited in claim 1, further comprising:
a communications interface configured to receive caller identification information associated with the third communications device; and
a controller configured to provide the caller identification information to the facility.

5. A method comprising:
providing an indicator of a concurrent call condition, by a first communications device associated with a first phone number including the facility, in response to a first call from the first communications device to a second communications device associated with a second phone number and a second call to the first communications device from a third communications device associated with a third phone number, different from the second phone number, the second and third phone numbers being associated with a user, the indicator being based on a contact entry of a database, the contact entry associating the second phone number and the third phone number with the user;
initiating a release of the first call from the first communications device to the second communications device; and
initiating a call connection of the second call received by the first communications device from the third communications device in response to a predetermined user input received by the first communications device,
wherein the first call includes a call connection between the first communications device and a voicemail system associated with the second communications device,
wherein the release of the first call includes terminating the call connection between the first communications device and the voicemail system and the release includes prompting a user of the communications device to delete an incomplete voicemail message prior to the termination.

6. The method, as recited in claim 5, further comprising:
requesting by the first communications device, to participate in a first call connection between the first communications device and the second communications device; and
receiving by the first communications device, a request for a second call connection between the first communications device and the third communications device.

7. The method, as recited in claim 5, wherein the user-indicator provides information associated with the third communications device.

8. The method, as recited in claim 5, wherein the user-indicator is provided after establishing a voicemail connection between the first communications device and a voicemail system associated with the second communications device.

9. The method, as recited in claim 5, further comprising:
initiating in response to a second predetermined user-input, deletion of an incomplete voicemail message from the voicemail system prior to terminating the voicemail connection.

10. The method, as recited in claim 5, further comprising:
initiating in response to a second predetermined user-input, inclusion of a predetermined message appended to an incomplete voicemail message prior to terminating the voicemail connection.

11. The method, as recited in claim 5, wherein the user-indicator is at least partially based on caller identification delivery on call waiting (CIDCW) information received by the first communications device from the third communications device.

12. An apparatus comprising:
a communications interface; and
means for providing a user indicator by a first communications device associated with a first phone number, for initiating both a release of the first call from the first communications device to the second communications device, and for initiating a call connection of the second call in response to a predetermined user input received by the first communications device in response to a first call from the first communications device to a second communications device associated with a second phone number and a second call to the first communications device from a third communications device associated with a third phone number, different from the second phone number, the second and third phone numbers being associated with a user, the user indicator being based on a contact entry of a database, the contact entry associating the second phone number and the third phone number with the user,
wherein the first call includes a call connection between the first communications device and a voicemail system associated with the second communications device,
wherein the release of the first call includes terminating the call connection between the first communications device and the voicemail system and the release includes prompting a user of the communications device to delete an incomplete voicemail message prior to the termination.

* * * * *